United States Patent
Cochran et al.

(10) Patent No.: US 12,079,786 B2
(45) Date of Patent: *Sep. 3, 2024

(54) SYSTEMS AND METHODS FOR TRANSFERRING FUNDS TO A PRE-PAID ACCOUNT

(71) Applicant: The Western Union Company, Denver, CO (US)

(72) Inventors: Chris Cochran, Highlands Ranch, CO (US); Gary Jeffords, Centennial, CO (US); Rodrigo Sada, Lone Tree, CO (US)

(73) Assignee: The Western Union Company, Denver, CO (US)

( * ) Notice: Subject to any disclaimer, the term of this patent is extended or adjusted under 35 U.S.C. 154(b) by 1211 days.

This patent is subject to a terminal disclaimer.

(21) Appl. No.: 16/709,296

(22) Filed: Dec. 10, 2019

(65) Prior Publication Data
US 2020/0184432 A1 Jun. 11, 2020

Related U.S. Application Data

(63) Continuation of application No. 14/051,058, filed on Oct. 10, 2013, now Pat. No. 10,504,074.

(51) Int. Cl.
*G06Q 20/10* (2012.01)
*G06Q 20/28* (2012.01)

(52) U.S. Cl.
CPC ............ *G06Q 20/10* (2013.01); *G06Q 20/28* (2013.01)

(58) Field of Classification Search
CPC ........ G06Q 40/02; G06Q 20/10; G06Q 20/28; G06Q 20/40; G06Q 20/102; G06Q 30/02; G06Q 30/04; G06Q 30/06; G06Q 40/00
(Continued)

(56) References Cited

U.S. PATENT DOCUMENTS 6,206,283 B1 3/2001 Bansal et al.
6,816,721 B1 11/2004 Rudisill
(Continued)

OTHER PUBLICATIONS

Website "eCount", Available Online at http://www.ecount.com Jul. 23, 2000, 15 pages.
(Continued)

*Primary Examiner* — Hani M Kazimi
(74) *Attorney, Agent, or Firm* — Kilpatrick Townsend & Stockton LLP

(57) ABSTRACT

According to the invention, a method for transferring funds from a sender to a pre-paid account to be assigned to a recipient is disclosed. The method may include receiving a request to perform a funds transfer, including an amount and a recipient, and determining whether to approve the request. Upon approval, the method may include selecting a first and second money transfer control number (MTCN). The method may include recording an association of the amount and the recipient with the first MTCN, and an association of the two MTCN's. The method may include sending the second MTCN out and later receiving a request to redeem which includes the second MTCN. The method may include determining the first MTCN based on the second MTCN, and whether to approve the request. Upon approval, an indication may be sent that the amount is available for funding of the pre-paid account of the recipient.

20 Claims, 4 Drawing Sheets

(58) Field of Classification Search
USPC .................................................. 705/39–42
See application file for complete search history.

(56) References Cited

U.S. PATENT DOCUMENTS

| | | | |
|---|---|---|---|
| 8,510,223 B2 | 8/2013 | Blair et al. | |
| 10,504,074 B2* | 12/2019 | Cochran | G06Q 20/28 |
| 2006/0006224 A1* | 1/2006 | Modi | G06Q 20/108 |
| | | | 235/379 |
| 2006/0138215 A1 | 6/2006 | Pallares | |
| 2007/0061257 A1 | 3/2007 | Neofytides et al. | |
| 2007/0198432 A1 | 8/2007 | Pitroda et al. | |
| 2008/0243690 A1 | 10/2008 | Paintin et al. | |
| 2009/0265272 A1 | 10/2009 | Dill et al. | |
| 2010/0049653 A1 | 2/2010 | Grotto | |
| 2010/0131408 A1* | 5/2010 | Perlman | G06Q 20/385 |
| | | | 705/35 |
| 2010/0332349 A1 | 12/2010 | Bonin et al. | |
| 2011/0040682 A1 | 2/2011 | Vasten | |
| 2011/0196787 A1 | 8/2011 | Alroy et al. | |
| 2011/0202455 A1 | 8/2011 | Vasten et al. | |
| 2012/0150739 A1 | 6/2012 | Abeles et al. | |
| 2014/0279417 A1 | 9/2014 | Rahman et al. | |
| 2015/0106259 A1 | 4/2015 | Cochran et al. | |

OTHER PUBLICATIONS

"The Way to Send and Receive Money on the Internet", Arthas Corp, DotBank, Downloaded from Website http://www.dotbank.com Feb. 7, 2000, 7 pages.

U.S. Appl. No. 14/051,058, filed Oct. 10, 2013, Final Office Action mailed Oct. 8, 2015, 16 pages.

U.S. Appl. No. 14/051,058, filed Oct. 10, 2013, Non-Final Office Action mailed Jan. 16, 2015, 11 pages.

U.S. Appl. No. 14/051,058, filed Oct. 10, 2013, Notice of Allowance mailed Jul. 29, 2019, 11 pages.

* cited by examiner

SYSTEMS AND METHODS FOR TRANSFERRING FUNDS TO A PRE-PAID ACCOUNT

CROSS-REFERENCE TO RELATED APPLICATIONS

This application is a continuation of U.S. patent application Ser. No. 14/051,058, filed Oct. 10, 2013, and entitled "Systems and Methods for Transferring Funds to a Pre-Paid Account," the entire disclosure of which is hereby incorporated by reference, for all purposes, as if fully set forth herein.

BACKGROUND OF THE INVENTION

This invention relates generally to systems for transferring funds between two entities. More specifically, the invention relates to methods of providing stored-value instruments as a pay-out method for person-to-person transfers.

BRIEF DESCRIPTION OF THE INVENTION

In one embodiment, a method for transferring funds from a sender to a pre-paid instrument account to be assigned to a recipient is provided. The method may include receiving, from a first agent system, a first request, the first request a request to perform a funds transfer from the sender to the recipient, where the first request includes an amount and an identification of the recipient. The method may also include determining whether or not to approve the first request. The method may further include selecting, based upon a determination that the first request is approved, a first money transfer control number and a second money transfer control number. The method may additionally include recording an association of the amount and the identification of the recipient with the first money transfer control number. The method may moreover include recording an association of the second money transfer control number with the first money transfer control number. The method may furthermore include sending, to the first agent system, the second money transfer control number. The method may also include receiving, from a second agent system, a second request, the second request a request to redeem the funds transfer, where the second request includes the second money transfer control number. The method may further include determining the first money transfer control number based on the second money transfer control number. The method may additionally include determining whether or not to approve the second request. The method may moreover include sending, to the second agent system, based upon the second money transfer control number and a determination that the second request is approved, an indication that the amount is available for funding of the pre-paid instrument account of the recipient.

In another embodiment, a non-transitory, machine-readable medium is provided. The non-transitory, machine-readable medium may have instructions stored thereon. The instructions may be executable by a processor for transferring funds from a sender to a pre-paid instrument account to be assigned to a recipient. The instructions may be executable by a processor to receive, from a first agent system, a first request, the first request a request to perform a funds transfer from the sender to the recipient, where the first request includes an amount and an identification of the recipient. The instructions may also be executable to determine whether or not to approve the first request. The instructions may further be executable to select, based upon a determination that the first request is approved, a first money transfer control number and a second money transfer control number. The instructions may additionally be executable to record an association of the amount and the identification of the recipient with the first money transfer control number. The instructions may additionally be executable to record an association of the second money transfer control number with the first money transfer control number. The instructions may moreover be executable to send, to the first agent system, the second money transfer control number. The instructions may furthermore be executable to receive, from a second agent system, a second request, the second request a request to redeem the funds transfer, where the second request includes the second money transfer control number. The instructions may also be executable to determine the first money transfer control number based on the second money transfer control number. The instructions may further be executable to determine whether or not to approve the second request. The instructions may additionally be executable to send, to the second agent system, based upon the second money transfer control number and a determination that the second request is approved, an indication that the amount is available for funding of the pre-paid instrument account of the recipient.

In another embodiment, a system for transferring funds from a sender to a pre-paid instrument account to be assigned to a recipient is provided. The system may include a computer system. The computer system may be configured to receive, from a first agent system, a first request, the first request a request to perform a funds transfer from the sender to the recipient, where the first request includes an amount and an identification of the recipient. The computer system may also be configured to determine whether or not to approve the first request. The computer system may further be configured to select, based upon a determination that the first request is approved, a first money transfer control number and a second money transfer control number. The computer system may additionally be configured to record an association of the amount and the identification of the recipient with the first money transfer control number. The computer system may moreover be configured to record an association of the second money transfer control number with the first money transfer control number. The computer system may furthermore be configured to send, to the first agent system, the second money transfer control number. The computer system may also be configured to receive, from a second agent system, a second request, the second request a request to redeem the funds transfer, where the second request includes the second money transfer control number. The computer system may further be configured to determine the first money transfer control number based on the second money transfer control number. The computer system may additionally be configured to determine whether or not to approve the second request. The computer system may moreover be configured to send, to the second agent system, based upon the second money transfer control number and a determination that the second request is approved, an indication that the amount is available for funding of the pre-paid instrument account of the recipient.

BRIEF DESCRIPTION OF THE DRAWINGS

The present invention is described in conjunction with the appended figures.

Figure 1:
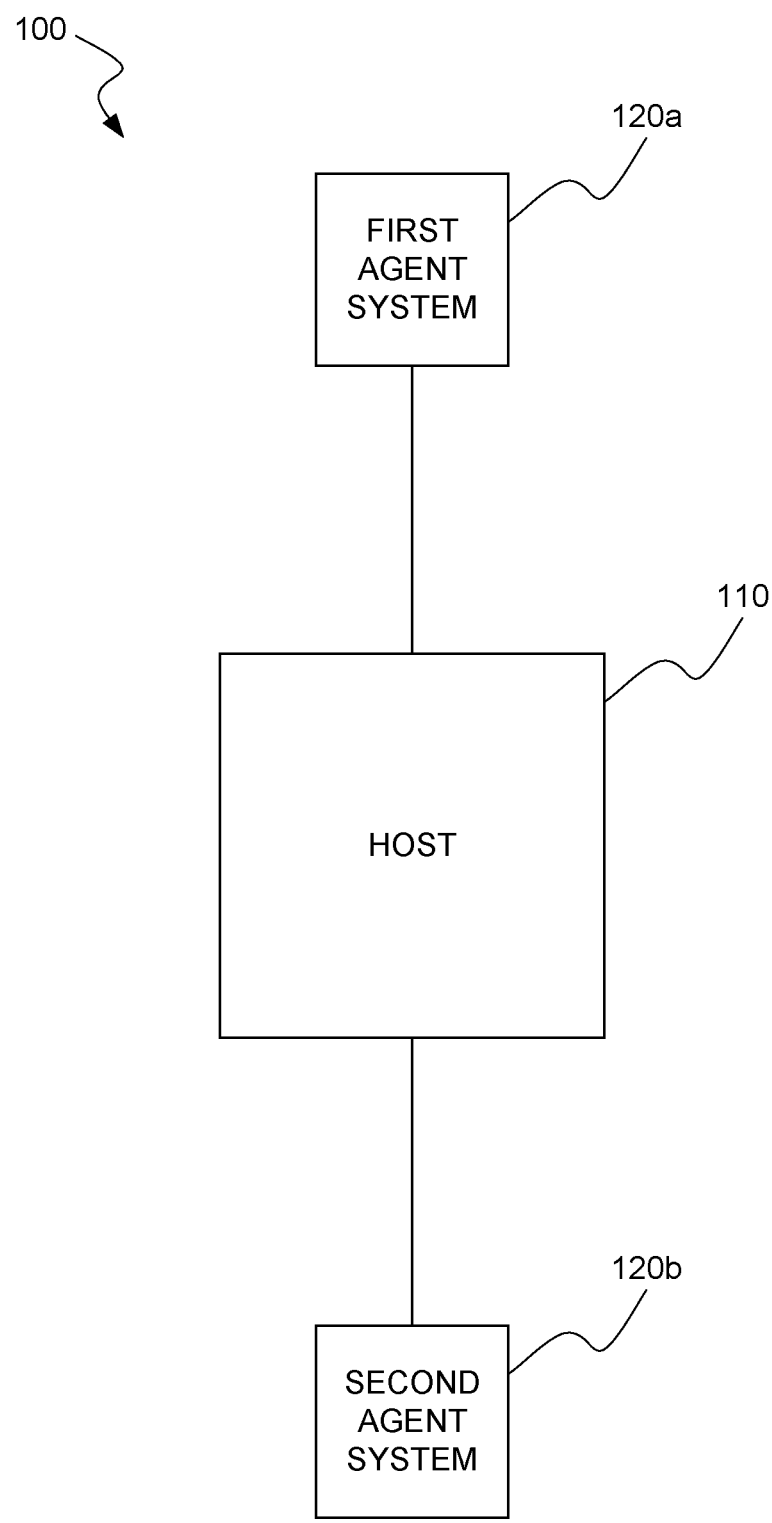
FIG. 1 is a block diagram of one system embodiment of the invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments. Furthermore, different embodiments of the invention may each have all, some, or none of the features discussed with regard to any particular specific embodiment herein. Some embodiments may have at least some of the features of one particularly discussed embodiment, as well as at least some of the features of another particularly discussed embodiment. Additionally, any time a feature is not discussed with regard to an embodiment in this disclosure, it will be understood that some embodiments of the invention may implicitly and specifically exclude such features, thereby providing support for negative claim limitations.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Turning now to FIG. 1, a system 100 for implementing methods of the disclosure is shown. System 100 may include a host 110 and one or more agent systems 120. Host 110 may be a centralized server or set of servers operating within one or more networks that provide communication routes between components of host 110, and separate, often remote, agent systems 120. In some embodiments, agent systems 120 may include computer systems and point of sale devices, potentially at agent retail locations around the world.

Agent systems 120 may provide a means for a sender or recipient in a money transfer transaction to initiate a money transfer or collect on a previously initiated money transfer. Though only two agent systems 120 are shown in system 100, many more may be present in other embodiments. Conversely, in some embodiments, a sender and recipient may use the same agent location to both initiate a money transfer and receive funds therefrom. In some embodiments, one or more agent systems may actually be an online access instance, either hosted by host 110 or an agent system 120.

Figure 2:
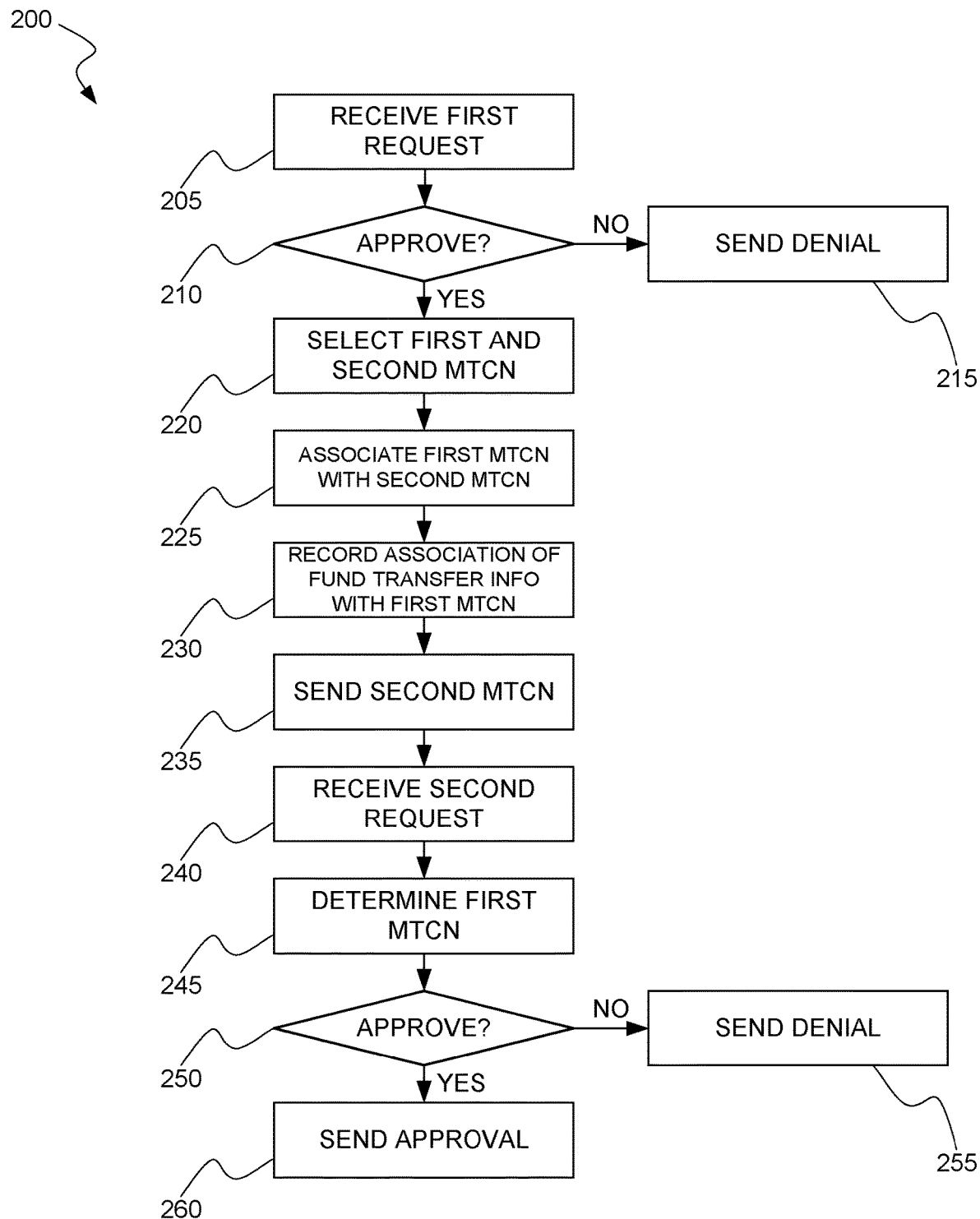
FIG. 2 is a block diagram of one method embodiment of the invention.

FIG. 2 shows a block diagram of a method 200 of the disclosure for conducting a money transfer that may result in a stored value card being ready for issuance to a recipient of the money transfer. Method 200 is presented from the point of view of host 110.

In an example transaction, a first person or entity wishes to transfer funds to a second person or entity. To initiate the transfer, the first person visits an agent location, or accesses a service online, and indicates their desire to initiate a transfer. There may be multiple ways of both paying for and receiving the funds. Merely by way of example, cash, check, debit, credit, pre-paid, and/or wire funds may be provided and/or received by the sender/recipient. The sender indicates who the recipient is, and the amount of funds they would like to transfer. Indicating who the recipient is may include providing a name, identifying number (for example, member number, telephone number, social security number, and/or driver's license number), address, etc. The amount of the transaction may be in any currency, and systems and methods herein may provide currency conversion at any step of a process. In some embodiments, the price or cost to conduct such a transfer may be less if the sender elects to send the funds for delivery onto a pre-paid card. Cost may be relevant especially in circumstances where the foreign exchange rate causes the transaction costs to vary. This example will assume that a sender has elected to transfer funds for delivery onto a new pre-paid card for the recipient.

Once information about the transfer is received from the sender, the agent system 120 transmits this information to host 110 as a transfer request. At block 205, host 110 receives the transfer request from the agent system 120. At block 210, host 110 analyzes the transfer request and determines whether or not to accept the request and therefore process the transaction. If, upon analysis of the details, host 110 determines that the transfer should not be conducted, then at block 215 the request is denied and a denial message is sent to agent system 120, as well as any other relevant systems.

However, if the transfer request is approved by host 110, then at block 220, host 110 selects a first identifier and second identifier. In this example, the identifiers may be referred to as the first and second money transfer control number ("MTCN"). The first identifier may be associated with the details of the money transfer transaction, including the amount and the recipient, and possibly including other information (for example, sender, sending agent, etc.) in a storage device, database, and/or table. In some embodiments, the first identifier may also be associated with a flag or other indicator which identifies it as a funds-to-pre-paid card transfer. In other embodiments, this flag or indicator will not be present. Regardless, the second identifier may be associated with the first identifier and may actually be used by the sender and recipient to complete the funds transfer as will be discussed below.

In some embodiments, the first identifier may include ten numeric digits, and the second identifier may include twelve numeric digits. Other combinations are possible, and any number of alpha-numeric digits may be used for each identifier. In some embodiments, differences in the form and/or content of the first identifier may distinguish the two identifiers. In the above example, a ten-digit identifier may indicate the identifier is a first identifier, which is directly associated with the funds to be transferred, while a twelve digit identifier may indicate the identifier a second identifier, which is directly associated with a first identifier, and indirectly associated with the funds to be transferred via the first identifier. In other embodiments, content of a particular identifier, such as a certain character or number being present in a certain digit position of the identifier may indicate whether the first or second identifier is represented by the particular identifier.

At block 225, host 110 associates the selected first MTCN with the selected second MTCN. At block 230, host 110 associates some or all of the funds transfer information described above with the first MTCN. At block 235, host 110 may send the second MTCN to the agent system 120 assisting the sender. The second MTCN may be provided by agent system 120 to the sender. The sender may then independently contact the intended recipient and provide them with the second identifier. In many embodiments, the first MTCN, along with its relationship to the second MTCN, might remain unknown to the sender and the recipient and will only be known to host 110.

Later, the recipient may visit an agent location and indicate their desire to complete the transfer. The agent may collect identifying information from the recipient along with the second MTCN. The agent system 120 handling the recipient's request may then transmit a request to complete the funds transfer to host 110. At block 240, host 110 may receive the request to withdraw the funds, which includes the second MTCN. At block 245, host 110 may reference the stored correlations between first and second identifiers and determine the first MTCN from the second MTCN found in the withdrawal request.

At block 250, host 110 may determine whether or not to approve withdrawal of the funds. This decision may be based on information provided by the potential recipient and thereafter transferred with the withdrawal request to host 110. For example, confirmation of identity information, the location of the agent system 120 from which the request is received, time since initiation of the money transfer by the sender, whether the funds transfer has already been previously completed, etc. If host 110 determines that the money transfer should not be processed, then at block 255 a denial message is sent to agent system 120, as well as any other relevant systems.

However, if host 110 determines the withdrawal/pay-out should occur, then at block 260 an approval message is sent to agent system 120 as well as any other relevant systems. In some embodiments, the approval message may include a flag or indicator that informs agent system 120 that the funds are only authorized for the fees already paid by the sender to be distributed via a pre-paid card. Host 110 may know to add the flag or indicator because such is present in reference to funds transfer information stored in association with the first MTCN. In other embodiments, the agent system may be independently aware of such a limitation on funds distribution because of the form and/or content of the second MTCN (for example, it included twelve digits rather than ten digits).

Figure 3:
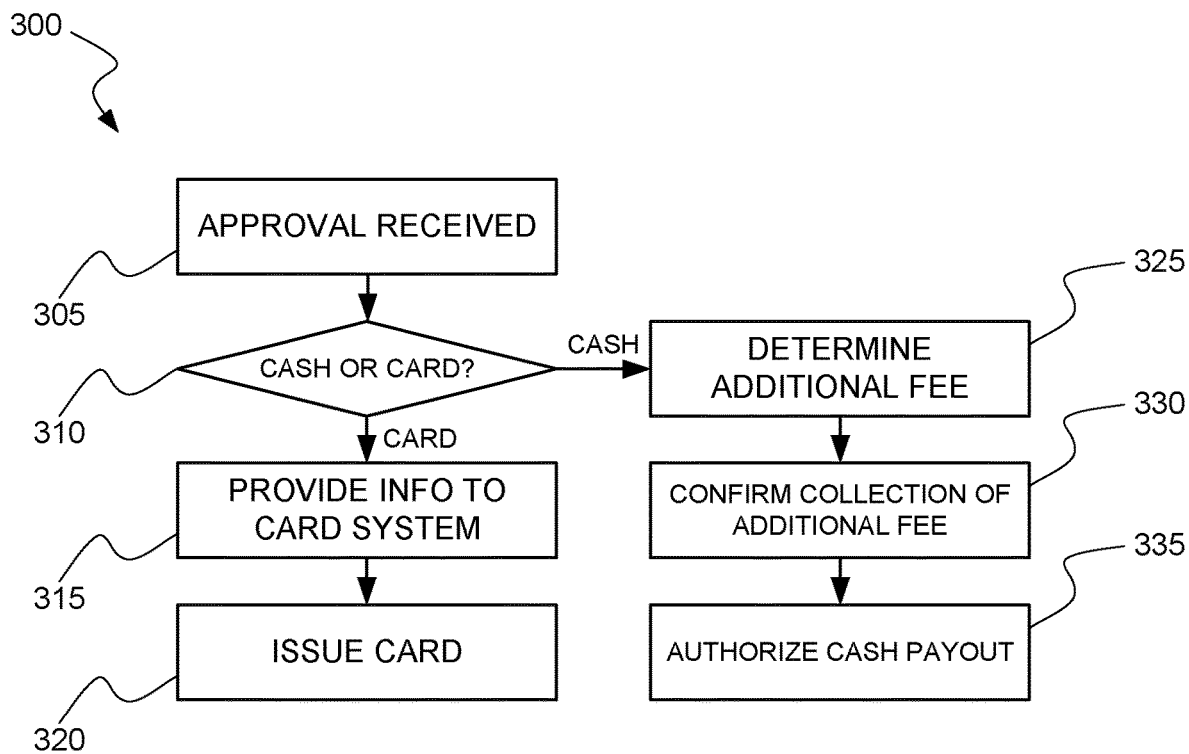
FIG. 3 is a block diagram of another method embodiment of the invention.

FIG. 3 shows a block diagram of a method 300 of the disclosure for completing the money transfer described above. Method 200 is presented from the point of view of the agent system 110 assisting the recipient.

At block 305, the approval to complete the funds transfer is received at the agent system 120 from host 110. The agent system 120 or an agent operating such system, will inquire with the recipient if they wish to receive a pre-paid card, as has been previously paid for by the sender, or if they wish to pay an additional fee, potentially from the proceeds of the funds transfer, to receive the funds as cash (or other possible form). The agent and/or agent system 120 may be aware that a pre-paid card is the default paid-for condition because of a flag or indication received from host 110, as described above, or because of the form/content of the second identifier provided by the recipient.

At block 310, a decision is received by agent system 120. If a pre-paid card is acceptable to the recipient, then the agent and/or agent system 120 provides information to a pre-paid card system to begin creation of the pre-paid card. The pre-paid card system may be a system associated closely with host 110 or may be a third-party system that will merely be funded by the agent or host and paid for their assistance accordingly. At block 320, the pre-paid card is issued to the recipient.

If the recipient instead elects to receive the funds transfer in cash or other form, then at block 325, agent system 120 may determine the additional fee. The agent or agent system 120 may then collect the additional fee from the recipient, and confirm the fee is collected at block 330. At block 335, the cash payout is authorized, and the agent or agent system 120 pays the recipient the amount of the funds transfer (minus the additional fee if paid therefrom).

Future reduced-cost transfers to a recipient's pre-paid card may also be made using the above systems and methods of the invention. The later-in-time transfers will merely be applied to the account of a pre-existing pre-paid card rather than the account of a newly activated card. The sender may provide an indication of this intent when making the transfer. An indicator of this intent may be included with the funds transfer request sent to host 110. In some embodiments, an additional identifier representing the pre-paid card account of the recipient may be requested (and so transferred) from the sender to ensure the funds are applied to the proper account. In other embodiments, the recipient may instead merely indicate to the recipient-assisting agent that they desire the funds to be applied to an existing pre-paid card in their possession.

In the above manner then, methods of encouraging senders and receivers to use a pre-paid card pay-out option may be provided. Additionally, agent procedure when assisting a recipient with a pay-out is simplified because the methods of the disclosure provide automated means for determining that for a particular identifier/MTCN, the default paid-for condition is to issue a pre-paid card. Finally, for different recipient locations around the world, different pre-paid services may be used depending on what is available, but regardless of the host 100/agent system 120 arrangement. Host-related pre-paid card providers may be used, or third part providers may also be utilized.

In an alternative embodiment, funds received from the sender may be associated with a new virtual stored value card or pre-paid account which exists only in a storage device or database, but for which no physical card is associated. In these embodiments, a secondary MTCN may not be used. Instead, the account number of the newly created virtual stored value card or pre-paid account may be provided back to the sender for transmittal to the recipient. The recipient may then use this number to initiate a transfer of the funds from this virtual stored value or prepaid account to a new stored value or prepaid account which is associated with a physical card (newly provided to recipient, or previously in their possession).

Figure 4:
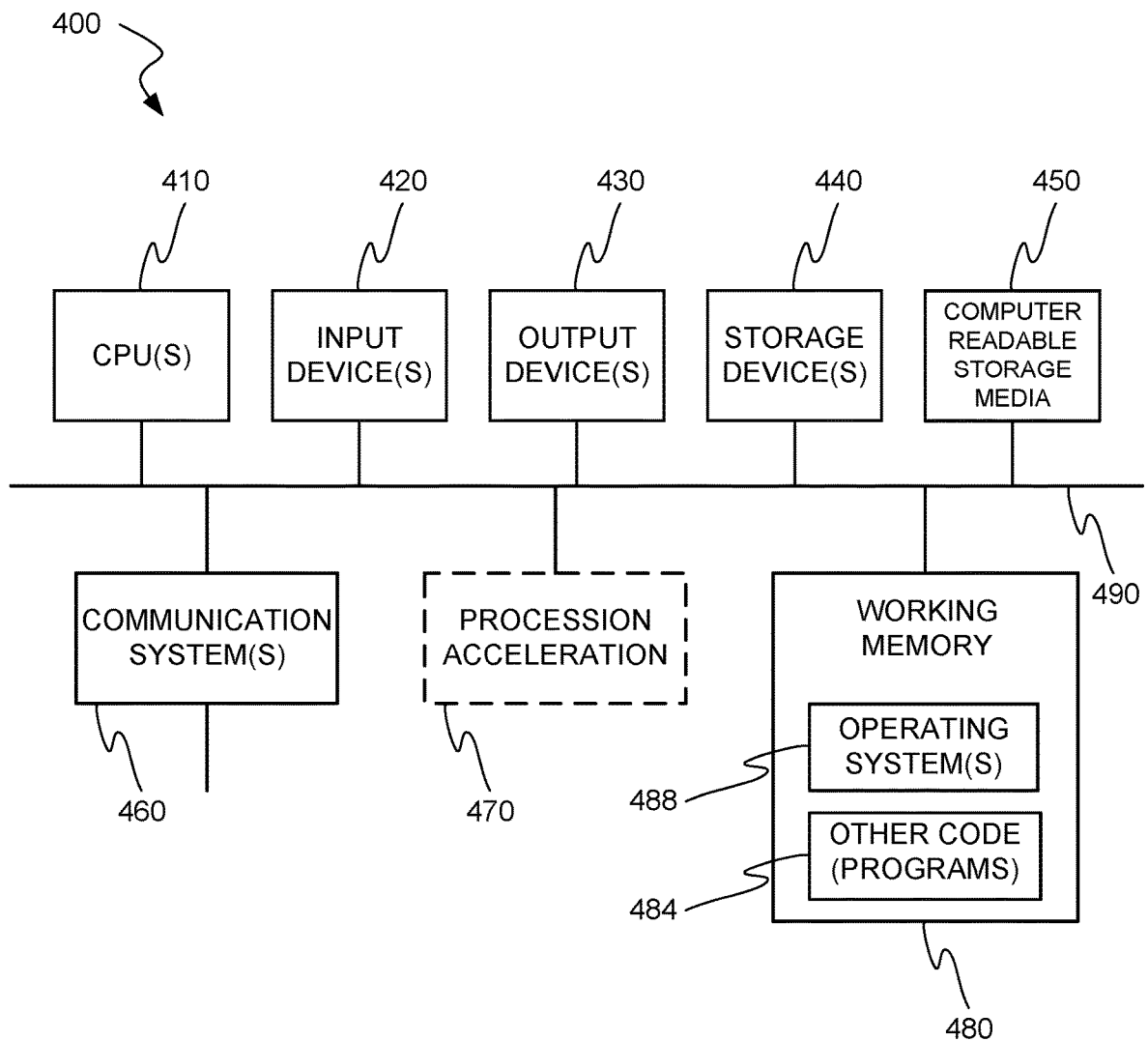
FIG. 4 is a block diagram of an exemplary computer system capable of being used in at least some portion of the apparatuses or systems of the present invention or implementing at least some portion of the methods of the present invention.

FIG. 4 is a block diagram illustrating an exemplary computer system 400 in which embodiments of the present invention may be implemented. This example illustrates a computer system 400 such as may be used, in whole, in part, or with various modifications, to provide the functions of the host, the agent systems, and/or other components of the invention such as those discussed above. For example, various functions of the host computer may be controlled by the computer system 400, including, merely by way of example, communicating with the agent systems, processing money transfer requests, associating information with MTCN's, associating primary MTCN's with secondary MTCN's, etc.

The computer system 400 is shown comprising hardware elements that may be electrically coupled via a bus 490. The hardware elements may include one or more central processing units 410, one or more input devices 420 (e.g., a mouse, a keyboard, etc.), and one or more output devices 430 (e.g., a display device, a printer, etc.). The computer system 400 may also include one or more storage device 440. By way of example, storage device(s) 440 may be disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 450, a communications system 460 (e.g., a modem, a network card (wireless or wired), an infra-red communication device, Bluetooth™ device, cellular communication device, etc.), and working memory 480, which may include RAM and ROM devices as described above. In some embodiments, the computer system 400 may also include a processing acceleration unit 470, which can include a digital signal processor, a special-purpose processor and/or the like.

The computer-readable storage media reader 450 can further be connected to a computer-readable storage medium, together (and, optionally, in combination with storage device(s) 440) comprehensively representing remote, local, fixed, and/or removable storage devices plus storage media for temporarily and/or more permanently containing computer-readable information. The communications system 460 may permit data to be exchanged with a network, system, computer and/or another component described above.

The computer system 400 may also comprise software elements, shown as being currently located within a working memory 480, including an operating system 484 and/or other code 488. It should be appreciated that alternate embodiments of a computer system 400 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 400 may include code 488 for implementing any or all of the function of the various elements of the architecture as described herein. For example, software, stored on and/or executed by a computer system such as system 400, can provide the functions of the host, the agent systems, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A method for transferring funds from a sender to a pre-paid instrument account to be assigned to a recipient, the method comprising:

receiving, from a first agent system, a first request to perform a funds transfer from the sender to the recipient, wherein the first request comprises an amount, an identification of the recipient, and an indication that a destination of the funds transfer is the pre-paid instrument account of the recipient;

determining whether to approve the first request;

selecting, based upon determining that the first request is approved, a first identifier;

recording, based on receipt of the indication that the destination of the funds transfer is the pre-paid instrument account, an association of the first identifier with a flag identifying the funds transfer as a funds to pre-paid instrument account transfer; and sending, to a second agent system, based upon a determination that the association of the first identifier with the flag identifying the funds transfer as a funds to pre-paid instrument account transfer, an indication that the amount is available for funding of the pre-paid instrument account of the recipient.

2. The method of claim 1, further comprising:
receiving, from the second agent system, a second request, wherein:
the second request is a request to redeem the funds transfer; and
the second request comprises a second identifier.

3. The method of claim 2, further comprising:
determining, by the first agent system, a previously recorded association between the first identifier and the second identifier, and wherein the first identifier is selected based on the previously recorded association.

4. The method of claim 2, further comprising:
determining whether to approve the second request based at least in part on the first identifier; and
sending, to the second agent system, based on determination that the second request is approved and that the association of the first identifier with the flag identifying the funds transfer as a funds to pre-paid instrument account transfer, the indication that the amount is available for funding of the pre-paid instrument account of the recipient.

5. The method of claim 2, wherein:
the first identifier comprises a first money transfer control number having a first number of characters; and
the second identifier comprises a second money transfer control number having a second number of characters that is different than the first number of characters.

6. The method of claim 1, further comprising:
funding a pre-paid card based on the amount that is available for funding of the pre-paid instrument account of the recipient.

7. The method of claim 2, further comprising:
authorizing, by the second agent system, collection of the funds transfer in cash; and
determining, by the second agent system, an additional fee for the collection of the funds transfer in cash.

8. The method of claim 7, further comprising:
reducing, by the second agent system, the amount that is available for funding of the pre-paid instrument account of the recipient based on the additional fee.

9. A system for transferring funds from a sender to a pre-paid instrument account to be assigned to a recipient, the system comprising:
a first agent system;
a second agent system; and
a server system configured to:
receive, from the first agent system, a first request to perform a funds transfer from the sender to the recipient, wherein the first request comprises an amount, an identification of the recipient, and an indication that a destination of the funds transfer is the pre-paid instrument account of the recipient;
determine whether to approve the first request;
select based upon determining that the first request is approved, a first identifier;
record, based on receipt of the indication that the destination of the funds transfer is the pre-paid instrument account, an association of the first identifier with a flag identifying the funds transfer as a funds to pre-paid instrument account transfer; and
send, to the second agent system, based upon a determination that the association of the first identifier with the flag identifying the funds transfer as a funds to pre-paid instrument account transfer, an indication that the amount is available for funding of the pre-paid instrument account of the recipient.

10. The system of claim 9, wherein the server system is further configured to:
receive, from the second agent system, a second request, wherein:
the second request is a request to redeem the funds transfer; and
the second request comprises a second identifier.

11. The system of claim 10, wherein the server system is further configured to:
determine whether to approve the second request based at least in part on the first identifier; and
send, to the second agent system, based on determining that the second request is approved and that the association of the first identifier with the flag identifying the funds transfer as a funds to pre-paid instrument account transfer, the indication that the amount is available for funding of the pre-paid instrument account of the recipient.

12. The system of claim 10, wherein the server system is further configured to:
determine, by the first agent system, a previously recorded association between the first identifier and the second identifier, and wherein the first identifier is selected based on the previously recorded association.

13. The system of claim 10, wherein:
the first identifier comprises a first money transfer control number having a first number of characters; and
the second identifier comprises a second money transfer control number having a second number of characters that is different than the first number of characters.

14. The system of claim 13, wherein:
the second number of characters in the second identifier indicates that the destination of the funds transfer is the pre-paid instrument account of the recipient.

15. The system of claim 9, wherein the server system is further configured to:
fund a pre-paid card based on the amount that is available for funding of the pre-paid instrument account of the recipient;
receive authorization, from the second agent system, for collection of the funds transfer in cash; and
receive, from the second agent system, an indication of an additional fee for the collection of the funds transfer in cash.

16. A non-transitory, machine-readable machine medium having instructions stored thereon, the instructions executable by one or more processors for transferring funds from a sender to a pre-paid instrument account to be assigned to a recipient, wherein the instructions are executable by the one or more processors to at least:
receive, from a first agent system, a first request to perform a funds transfer from the sender to the recipient, wherein the first request comprises an amount, an identification of the recipient, and an indication that a destination of the funds transfer is the pre-paid instrument account of the recipient;
determine whether to approve the first request;
select, based upon determining that the first request is approved, a first identifier;
record, based on receipt of the indication that the destination of the funds transfer is the pre-paid instrument account, an association of the first identifier with a flag identifying the funds transfer as a funds to pre-paid instrument account transfer; and
send, to a second agent system, based upon a determination that the association of the first identifier with the flag identifying the funds transfer as a funds to pre-paid instrument account transfer, an indication that the amount is available for funding of the pre-paid instrument account of the recipient.

17. The non-transitory, machine-readable medium of claim 16, wherein the instructions are further executable to:
receive, from the second agent system, a second request, wherein:
the second request is a request to redeem the funds transfer; and
the second request comprises a second identifier.

18. The non-transitory, machine-readable medium of claim 17, wherein the instructions are further executable to:
determine whether to approve the second request based at least in part on the first identifier; and
send, to the second agent system, based on determining that the second request is approved and that the association of the first identifier with the flag identifying the funds transfer as a funds to pre-paid instrument account transfer, the indication that the amount is available for funding of the pre-paid instrument account of the recipient.

19. The non-transitory, machine-readable medium of claim 17, wherein the instructions are further executable to:
determine, by the first agent system, a previously recorded association between the first identifier and the second identifier, and wherein the first identifier is selected based on the previously recorded association.

20. The non-transitory, machine-readable medium of claim 16, wherein the instructions are further executable to:
fund a pre-paid card based on the amount that is available for funding of the pre-paid instrument account of the recipient;
receive authorization, from the second agent system, for collection of the funds transfer in cash; and
receive, from the second agent system, an indication of an additional fee for the collection of the funds transfer in cash.

* * * * *